(12) United States Patent
Shaw et al.

(10) Patent No.: US 10,674,196 B2
(45) Date of Patent: Jun. 2, 2020

(54) PROVIDING EXTRACTED SEGMENT FROM STREAMED CONTENT

(71) Applicant: Piksel, Inc., Wilmington, DE (US)

(72) Inventors: Philip Shaw, York (GB); Fabrice Hamaide, Paris (FR)

(73) Assignee: PIKSEL, INC., Wilmington, DE (US)

( * ) Notice: Subject to any disclaimer, the term of this patent is extended or adjusted under 35 U.S.C. 154(b) by 0 days.

(21) Appl. No.: 15/736,966

(22) PCT Filed: Jun. 15, 2016

(86) PCT No.: PCT/EP2016/063804
§ 371 (c)(1),
(2) Date: Dec. 15, 2017

(87) PCT Pub. No.: WO2016/202889
PCT Pub. Date: Dec. 22, 2016

(65) Prior Publication Data
US 2018/0176607 A1     Jun. 21, 2018

Related U.S. Application Data

(60) Provisional application No. 62/175,878, filed on Jun. 15, 2015.

(51) Int. Cl.
*H04N 21/262* (2011.01)
*H04N 21/231* (2011.01)
(Continued)

(52) U.S. Cl.
CPC ...... *H04N 21/26233* (2013.01); *H04H 60/46* (2013.01); *H04L 65/607* (2013.01);
(Continued)

(58) Field of Classification Search
CPC ......... H04N 21/2187; H04N 21/26613; H04N 21/2541; H04N 21/2402; H04N 21/23418;
(Continued)

(56) References Cited

U.S. PATENT DOCUMENTS 8,768,142 B1   7/2014  Ju
8,942,533 B2*  1/2015  Wiklof ............... H04N 1/00933
                                                386/200

(Continued)

FOREIGN PATENT DOCUMENTS

EP         2 403 236 A1     1/2012

OTHER PUBLICATIONS

Wen Gao, et al., "Vlogging: A Survey of Videoblogging Technology on the Web", ACM Comput. Surv. 42, ACM, NY, NY, Jun. 23, 2010.
(Continued)

*Primary Examiner* — Sumaiya A Chowdhury
(74) *Attorney, Agent, or Firm* — Holzer Patel Drennan (57) ABSTRACT

A method for providing of a portion or segment of content extracted from a larger content, for example, for sharing with users as a clip of the larger segment of content or as an action replay. One particular method of providing a portion of content includes receiving data including the content; transmitting the received data; storing a portion of the received data corresponding to a given time period; and responsive to a request, block transmitting the stored portion of the received data stream.

17 Claims, 5 Drawing Sheets

(51) Int. Cl.
| | |
|---|---|
| H04N 21/232 | (2011.01) |
| H04N 21/235 | (2011.01) |
| H04N 21/24 | (2011.01) |
| H04N 21/242 | (2011.01) |
| H04N 21/2665 | (2011.01) |
| H04N 21/2668 | (2011.01) |
| H04N 21/4223 | (2011.01) |
| H04N 21/43 | (2011.01) |
| H04N 21/4402 | (2011.01) |
| H04N 21/442 | (2011.01) |
| H04N 21/482 | (2011.01) |
| H04N 21/6332 | (2011.01) |
| H04N 21/84 | (2011.01) |
| H04N 21/8547 | (2011.01) |
| H04N 21/433 | (2011.01) |
| H04N 21/443 | (2011.01) |
| H04N 21/81 | (2011.01) |
| H04N 21/2343 | (2011.01) |
| H04N 21/8358 | (2011.01) |
| H04N 21/414 | (2011.01) |
| H04N 21/218 | (2011.01) |
| H04N 21/2187 | (2011.01) |
| H04N 21/633 | (2011.01) |
| H04H 60/46 | (2008.01) |
| H04N 21/234 | (2011.01) |
| H04L 29/06 | (2006.01) |
| H04N 21/254 | (2011.01) |
| H04N 21/266 | (2011.01) |
| H04N 21/258 | (2011.01) |

(52) U.S. Cl.
CPC ... *H04N 21/2187* (2013.01); *H04N 21/21805* (2013.01); *H04N 21/232* (2013.01); *H04N 21/235* (2013.01); *H04N 21/2343* (2013.01); *H04N 21/2353* (2013.01); *H04N 21/2358* (2013.01); *H04N 21/23106* (2013.01); *H04N 21/23418* (2013.01); *H04N 21/23439* (2013.01); *H04N 21/234336* (2013.01); *H04N 21/2402* (2013.01); *H04N 21/242* (2013.01); *H04N 21/2407* (2013.01); *H04N 21/2541* (2013.01); *H04N 21/25866* (2013.01); *H04N 21/2665* (2013.01); *H04N 21/2668* (2013.01); *H04N 21/26208* (2013.01); *H04N 21/26613* (2013.01); *H04N 21/414* (2013.01); *H04N 21/41407* (2013.01); *H04N 21/4223* (2013.01); *H04N 21/433* (2013.01); *H04N 21/4305* (2013.01); *H04N 21/4307* (2013.01); *H04N 21/4331* (2013.01); *H04N 21/4334* (2013.01); *H04N 21/44029* (2013.01); *H04N 21/4431* (2013.01); *H04N 21/44204* (2013.01); *H04N 21/440236* (2013.01); *H04N 21/440263* (2013.01); *H04N 21/4828* (2013.01); *H04N 21/633* (2013.01); *H04N 21/6332* (2013.01); *H04N 21/8186* (2013.01); *H04N 21/8358* (2013.01); *H04N 21/84* (2013.01); *H04N 21/8547* (2013.01)

(58) Field of Classification Search
CPC .. H04N 21/235; H04N 21/433; H04N 21/414; H04N 21/633; H04N 21/2343; H04N 21/4431; H04N 21/21805; H04N 21/8547; H04N 21/84; H04N 21/8358; H04N 21/8186; H04N 21/6332; H04N 21/4828; H04N 21/23439; H04N 21/44204; H04N 21/234336; H04N 21/440263; H04N 21/440236; H04N 21/4334; H04N 21/4331; H04N 21/4307; H04N 21/4305; H04N 21/4223; H04N 21/41407; H04N 21/2668; H04N 21/2665; H04N 21/26208; H04N 21/242; H04N 21/2407; H04N 21/2358; H04N 21/2353; H04N 21/232; H04N 21/23106; H04N 21/44029; H04N 21/26233; H04L 65/607; H04H 60/46
See application file for complete search history.

(56) References Cited

U.S. PATENT DOCUMENTS

| | | | |
|---|---|---|---|
| 2005/0278759 A1* | 12/2005 | Unger | H04N 21/4147 725/89 |
| 2008/0004915 A1 | 2/2008 | Haeser | |
| 2008/0313541 A1* | 12/2008 | Shafton | G06F 17/30817 715/725 |
| 2009/0148124 A1 | 6/2009 | Athsani | |
| 2010/0131998 A1* | 5/2010 | Yu | H04N 7/17318 725/110 |
| 2010/0188577 A1* | 7/2010 | Jing | H04N 5/4448 348/559 |
| 2011/0214156 A1* | 9/2011 | Desmicht | H04N 5/44 725/151 |
| 2014/0281011 A1 | 9/2014 | Zarom | |
| 2014/0328578 A1 | 11/2014 | Shafron et al. | |
| 2015/0043892 A1 | 2/2015 | Groman | |
| 2015/0312354 A1* | 10/2015 | Boyle | H04N 21/21805 709/219 |
| 2017/0195616 A1* | 7/2017 | Kittaneh | H04N 21/433 |

OTHER PUBLICATIONS

International Search Report and Written Opinion for Application PCT/EP2016/063804, issued by the European Patent Office, dated Sep. 30, 2016.
Pereira F. et al., "Multimedia Retrieval and Delivery: Essential Metadata Challenges and Standards", Proceedings of the IEEE, New York, vol. 96, No. 4, Apr. 1, 2008.
Hesselman, Cristian, et al., "Sharing Enriched Multimedia Experiences Across Heterogeneous Network Infrastructures", IEEE Communications Magazine, vol. 48, No. 6, Jun. 1, 2010.

* cited by examiner

PROVIDING EXTRACTED SEGMENT FROM STREAMED CONTENT

BACKGROUND TO THE INVENTION

Field of the Invention

The present invention relates to the provision of a portion of content of a larger segment of content, for example for sharing with users as a clip of the larger segment of content or as an action replay.

Description of the Related Art

Publishing live video streams is very common, as users seek to share interesting moments of their daily lives with friends and followers. Reaching the desired audience is, though, problematic. Notifications alerting others to the availability of a live stream are generally limited to text and maybe a static image, but this may not be enough to summarise what is interesting about a particular live stream.

The ad-hoc nature of these streams is such that even when the stream is published the user generating the stream may not know in advance what is going to be shown or which moments will be most engaging. Thus setting up accurate meta data to describe the stream before it is generated may not always be possible. In any case, the more information that is needed to be provided before streaming starts, then the less casual and natural the ensuing video becomes.

Similarly, notifications describing a new event with text and/or an image require the receiving user to launch an app or open a web page to the event in order just to see if they want to watch more or not. This is a significant effort barrier for content that is meant to be consumed informally.

Rather than relying upon (or requiring) publishing users to add meta data to their streams, or text image notifications about events, it is generally known that being able to share a short clip of an event to social media while the stream is in progress is a good way to give potential viewers a snippet of interesting content from the stream to whet their appetite. As users are utilising social networks anyway, there is a lower effort barrier to browsing them.

Considering again the ad-hoc nature of these events, and given that it is not always possible or desirable to plan exactly what will be interesting, it is important for publishing users (users generating streams) to be able to share interesting moments as they arise. Again, instead of requiring the user to begin the process of creating a shareable clip first and then contriving an interesting moment, it would be preferable to allow the publisher to simply tap "share" after an interesting moment has naturally arisen.

In this way, the publishing user can concentrate on filming their event and can tap share as and when anything has just happened. There is no need to start the clipping before a moment in the hope that it turns out to be interesting.

Providing this feature, however, creates a number of technical challenges.

Whilst the mobile device is already loaded with the task of capturing videos to publish it to a live stream, in order to create clips retrospectively the device needs to somehow retain enough of the video data for long enough to achieve this.

Storing the whole stream as a local file will require the processing load to stream and encode an ever expanding file, and this will become significant. Storing such an asset will also become prohibitive. Moreover, to share a moment that just happened, it is probably redundant to store more than the last minute of content, for example.

It therefore needs to be considered as to how to arrange for the mobile device to cache video for long enough, and with minimal processing overhead, so that any just finish moment of interesting material can be composed into a shareable clip. At the same time, any cached video data needs to be discarded, having not been clipped, which becomes old enough that it is unlikely to be part of any interesting moment.

Storage space, processing power and volatile memory are all at a premium on such a device, and any workable clip and share solution has to balance these against interfering with the publishing users overall experience of live streaming.

It is an aim to address the above problems.

SUMMARY OF THE INVENTION

In an aspect there is provided a method of providing a portion of content comprising: receiving data including said content; transmitting the received data; storing a portion of the received data corresponding to a given time period; responsive to a request, transmitting the stored portion of the received data stream.

The portion may be stored in a first-in, first-out buffer having a predetermined length, wherein a portion of the received data corresponding to the predetermined length is stored. The portion stored may be the most recently received portion. The stored portion may be updated on receipt of the data, such that the most recent portion of the data corresponding to the predetermined length is stored. A part of the stored received data is deleted on storing of a new part of the received data.

Responsive to the request the stored portion may be processed for transmission.

The request may be received at the device processing the data.

The portion of content may be a clip of the content.

The portion of content may be a replay of data previously processed for transmission.

The data received may be video data, storing comprises storing a portion of the video data, and transmitting includes converting the video data into a data stream.

The data may be received as a data stream.

An aspect also provides a computer device for providing a portion of content, configured to: receive data including said content; transmitting the received data; store a portion of the received data corresponding to a given time period; responsive to a request, transmitting the stored portion of the received data stream.

The computer device may be configured to store the portion in a first-in, first-out buffer having a predetermined length, wherein a portion of the received data corresponding to the predetermined length is stored. The computer device may be configured to store the portion most recently received.

The computer device may be configured to update the stored portion on receipt of the data, such that the most recent portion of the data corresponding to the predetermined length is stored. The computer device may be configured to delete a part of the stored received data on storing of a new part of the received data.

The computer device may be configured, responsive to the request, to process the stored portion for transmission.

The computer device may be configured to receive the request at the device for transmitting the data.

The portion of content may be a clip of the content.

The portion of content may be a replay of data previously processed for transmission.

The computer device may be configured such that the data received is video data, the storing comprises storing a portion of the video data, and the transmitting includes converting the video data into a data stream.

The computer device may be configured to receive as a data stream.

The computer device may comprise a mobile device. The computer device may comprise a server.

In examples there is provided, in a system comprising a server for receiving video streams from each of a plurality of capture devices, a method comprising: storing data (e.g. for at least one video stream), a copy of the data (e.g. video stream) in a buffer, wherein the transmission of data (e.g. a video stream) is selectively adapted in dependence on the data (e.g. video stream) stored in the buffer. This example may be referred to as capture device processing.

When the buffer is full, there may be replaced a section of the buffer with a section of the data (e.g. video stream), such that the buffer content provides a sample of the data (e.g. video stream).

In examples, in response to a control signal, a capture device may transmit the stored content associated with a video stream. The transmission of a live video stream may be suspended when the stored content is transmitted. The stored content may be the transmitted video stream for a period of time corresponding to a period of time immediately preceding the time at which the control signal was received. The control signal may be received from a user of the capture device.

The storing is preferably performed at the capture device but may be performed at the server or at the viewing device.

BRIEF DESCRIPTION OF THE FIGURES

The invention is described by way of reference to the accompanying figures, in which.

DESCRIPTION OF PREFERRED EMBODIMENTS

Figure 1:
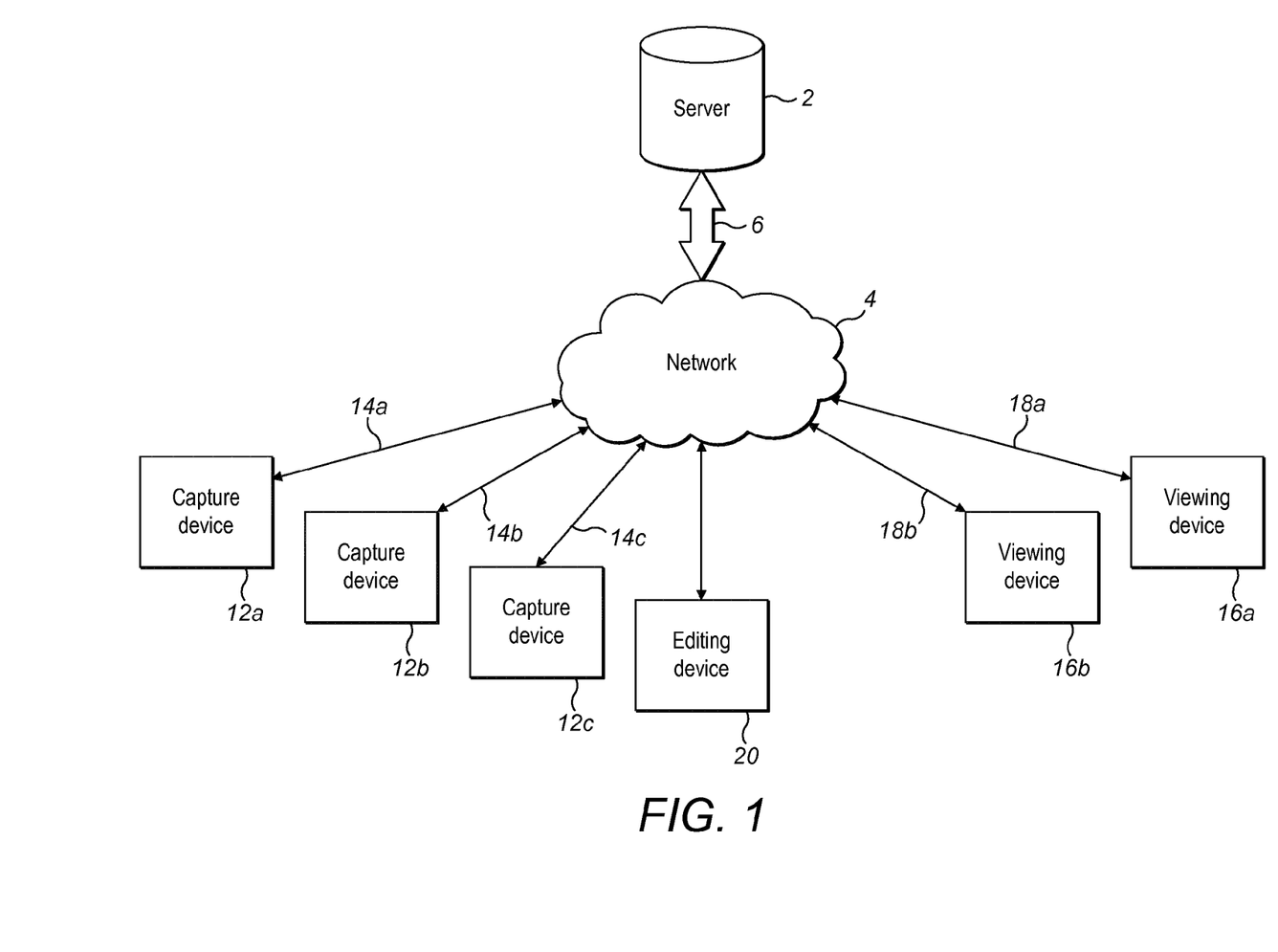
FIG. 1 illustrates an architecture of an exemplary system for capturing, processing, and consuming data.

With reference to FIG. 1 there is illustrated a system architecture within which embodiments may be implemented.

With reference to FIG. 1 there is illustrated: a plurality of devices, labelled capture devices, denoted by reference numerals 12a, 12b, 12c; a plurality of devices, labelled viewing devices, denoted by reference numerals 16a, 16b; a device, labelled editing device, denoted by reference numeral 20a; a network denoted by reference numeral 4; and a server denoted by reference numeral 2.

Each of the devices 12a, 12b, 12c is referred to as a capture device as in the described embodiments of the invention the devices capture content. However the devices are not limited to capturing content, and may have other functionality and purposes. In examples each capture device 12a, 12b 12c may be a mobile device such as a mobile phone.

Each of the capture devices 12a, 12b, 12c may capture an image utilising a preferably integrated image capture device (such as a video camera), and may thus generate a video stream on a respective communication line 14a, 14b, 14c. The respective communication lines 14a, 14b, 14c provide inputs to the network 4, which is preferably a public network such as the Internet. The communication lines 14a, 14b, 14c are illustrated as bi-directional, to show that the capture devices 12a, 12b, 12c may receive signals as well as generate signals.

The server 2 is configured to receive inputs from the capture devices 12a, 12b, 12c as denoted by the bi-directional communication lines 6, connected between the server 2 and the network 4. In embodiments, the server 2 receives a plurality of video streams from the capture devices, as the signals on lines 14a, 14b, 14c are video streams.

The server 2 may process the video streams received from the capture devices as will be discussed further hereinbelow.

The server 2 may generate further video streams on bi-directional communication line 6 to the network 4, to the bi-directional communication lines 18a, 18b, associated with the devices 16a, 16b respectively.

Each of the devices 16a, 16b is referred to as a viewing device as in the described embodiments of the invention the devices allow content to be viewed. However the devices are not limited to providing viewing of content, and may have other functionality and purposes. In examples each viewing device 16a, 16b may be a mobile device such as a mobile phone.

The viewing devices 16a and 16b may be associated with a display (preferably an integrated display) for viewing the video streams provided on the respective communication lines 18a, 18b.

A single device may be both a capture device and a viewing device. Thus, for example, a mobile phone device may be enabled in order to operate as both a capture device and a viewing device.

A device operating as a capture device may generate multiple video streams, such that a capture device such as capture device 12a may be connected to the network 4 via multiple video streams, with multiple video streams being provided on communication line 14a.

A viewing device may be arranged in order to receive multiple video streams. Thus a viewing device such as viewing device 16a may be arranged to receive multiple video streams on communication line 18a.

A single device may be a capture device providing multiple video streams and may be a viewing device receiving multiple video streams.

Each capture device and viewing device is connected to the network 4 with a bi-directional communication link, and thus one or all of the viewing devices 16A, 16B may provide a signal to the network 6 in order to provide a feedback or control signal to the server 2. The server 2 may provide control signals to the network 4 in order to provide control signals to one or more of the capture devices 12a, 12b, 12c.

The capture devices 12a, 12b, 12c are preferably independent of each other, and are independent of the server 2. Similarly the viewing devices 16a, 16b are preferably independent of each other, and are independent of the server 2.

The capture devices 12a, 12b, 12b are shown in FIG. 1 as communicating with the server 2 via a single network 4. In practice the capture devices 12a, 12b, 12c may be connected to the server 2 via multiple networks, and there may not be a common network path for the multiple capture devices to the server 2. Similarly the viewing devices 16a, 16b may be connected to the server 2 via multiple networks, and there may not be a single common network path from the server 2 to the viewing devices 16a, 16b.

The system architecture of FIG. 1 may be used to stream live content from capture devices to the server, and then for viewing devices to access the live content in streams from the server.

One solution to the problem, when streaming using a segmented streaming technology such as HLS or DASH, of providing clips of streamed content is to create a live stream that will be sent to the server, and also to cache the individual stream segments for reuse by a clip and share function. However, this is not particularly practical. A typical segment length of 10 seconds is too coarse a granularity to be useful. A user has to be able to clip the last few seconds of material, and should not be constrained to being able to clip only content that aligns with these segment boundaries.

While one solution is to reduce the segment length to alleviate this, and string several segments together to make a shareable clip, doing so increases the effort of delivering the live stream, with more final "puts' and manifest updates, thus creating a solution that impacts on the publishing experience.

It is proposed that instead of reducing the segment size and using the segments for both the live stream and any clipping means, to provide a separate process that consumes the same raw video camera data which is used for generating the live stream, and from which a limited FIFO (first in first out) queue of short video clips can be created. Such a queue acts as a temporary video data buffer that is just large enough, and no larger, to hold enough short clips from which a shareable clip can be composed.

Figure 2:
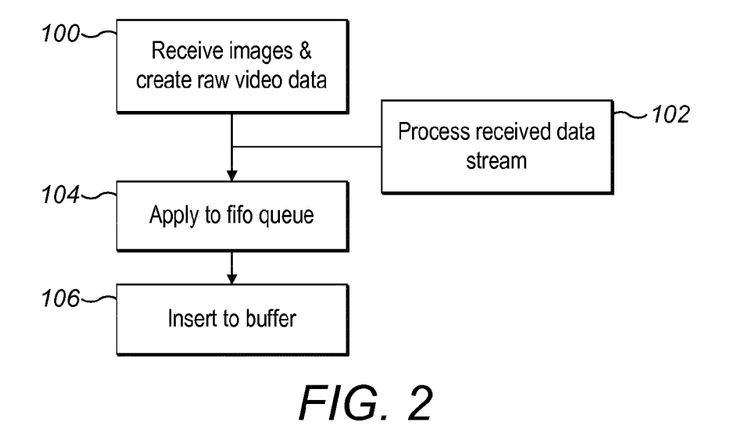
FIG. 2 illustrates an exemplary process for capturing data.

With reference to FIG. 2, there is illustrated a simple process embodying this which process operates at the capture device. In a step 100 data is captured by the capture device. The capture device may be provided with a camera which presents video content of a captured event within the capture device. Thus raw video data is received by the capture device in step 100. This raw video data stream may be captured at any one of the capture devices 12a, 12b, 12c.

Thereafter there are two processes implemented within the capture device.

Firstly, as denoted by step 102, the raw video data is processed for forwarding as a data stream to the server 2, on one of lines 14a, 14b, 14c. This operation of the capture device is not further described herein, and in line with the normal operation of the capture device for generating data streams.

In addition, the raw video data is applied to a FIFO queue as denoted by step 104. Thus the raw video data is applied to the FIFO queue in step 104 as is forwarded for processing in step 102.

In step 106 the raw video data as applied to the FIFO queue is inserted to a buffer.

Figure 3:
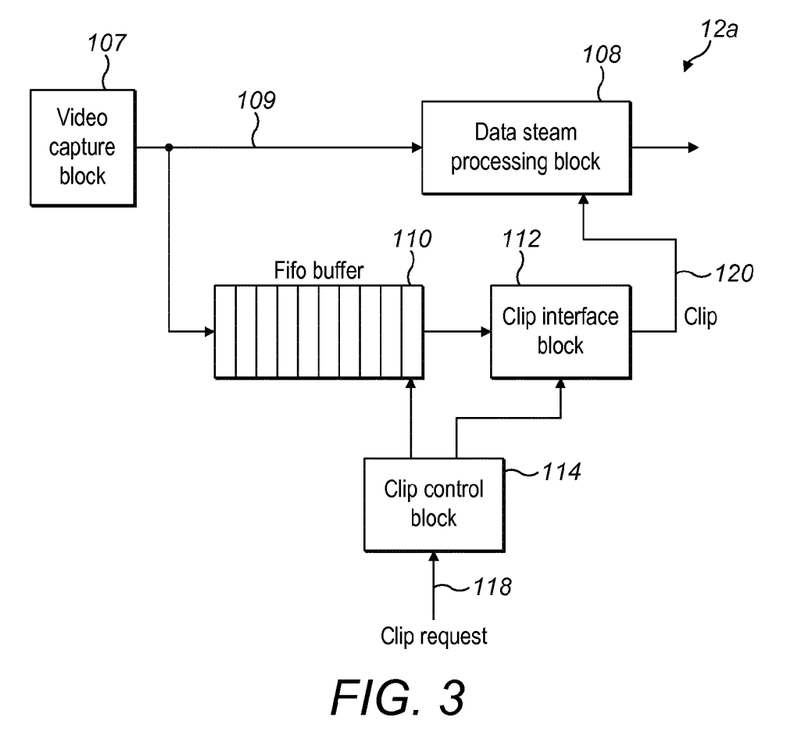
FIG. 3 illustrates an exemplary system for generating a clip.

Turning to FIG. 3, the implementation of such a process in a capture device is further explained. In FIG. 3 there is shown a portion of a capture device, for example capture device 12a. The capture device 12a includes a video capture block 107, a data stream processing block 108, a FIFO buffer 110, a clip control block 114, and a clip interface block 112.

The video capture block 107 may be a video camera, which generates raw video data on a signal line 109.

This raw video data on signal line 109 is input to the data stream processing block 108 for processing to generate a data stream for transmission to the server 2. The functionality implemented by the data stream processing block 108 is in accordance with the step 102 of FIG. 2.

In addition, and consistent with step 104, the raw video data on line 109 forms an input to the FIFO buffer 110. The FIFO buffer 110 receives a control signal from the clip control block 114, and generates an output to the clip interface block 112. The clip interface block 112 generates clip portions on line 120 for viewing. As will be discussed further hereinbelow, the clip control block 114 receives a clip request signal on line 118.

The arrangement of FIG. 3 is now further described with reference to an example. In this example, it is assumed that the publishing user (i.e. the user of the capture device generating the capture stream) always wants to be able to share the last 10 seconds of content. Thus the FIFO buffer 110 has 10 slots into which clips lasting one second each may be serially pushed. This is illustrated in FIG. 3 by the FIFO buffer 110 showing a division into ten portions.

As the live broadcast begins, and the live content is captured by the video capture block 107, and the raw video data provided on signal line 109, then the slots of the FIFO buffer 110 begin to fill up. After 10 seconds the FIFO buffer 110 is full. As the buffer is full after 10 seconds, any new one-second clip of raw video data that arrives is added to the end of the FIFO buffer 110, in the end slot, whilst at the same time the oldest one-second clip (from the front slot of the FIFO) is discarded.

In this way, the FIFO buffer 110 always has the most recent 10 one-second clips of raw video data ready to string together if a clip is generated.

In the above example it is set out that each clip is one second long, but this will be dependent upon the implementation. For example, depending on the level of granularity required, the clips could be shorter or longer. Similarly, the choice to store 10 one-second clips is implementation dependent, more or less clips may be stored, and the FIFO buffer may be capable of storing an overall section of longer than 10 seconds (or shorter than 10 seconds).

In terms of the generation of the clip request signal on line 118, in examples this clip request signal 118 is received from the capture device itself. The user of a capture device may be provided with a user interface display which displays an appropriate icon, and on selection of that icon (e.g. by their finger) an indication is given that a clip is to be shared. Responsive to selection of the icon the clip request signal is generated on line 118 to the clip control block 114.

The click control block 114 then outputs a clip from the FIFO buffer 110 to the clip interface block 112, which is also controlled by the clip control block 114 to generate the clip on a line 120. Thus the raw video data stored in the FIFO buffer 110 is output on line 120 and provided to the data stream processing block 108. The data stream processing block then processes the clip for inclusion on the data stream to the server.

Figure 4:
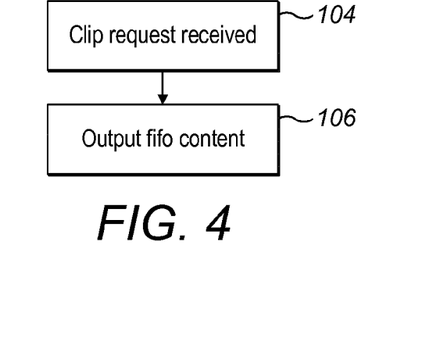
FIG. 4 illustrates an exemplary process for generating a clip.

This is further illustrated by the simple method process of FIG. 4. In step 120 a clip request is received, and then in step 122 the content of the FIFO buffer is output.

There is described above an example in which only as much raw video content as is likely to be needed to create a shareable clip is retained. This technique can be implemented without having any effect on the live streaming function. The software that processes the raw video data into a live data stream (implemented in block 108) must prepare each raw video data frame for streaming. However the clip and share process described in relation to the above example has no such requirement for clips. The data the capture device collects only needs to be processed for streaming if the user chooses to share it. As such, there is a processing saving that can be made. The processing into a data stream is only performed for clips when a clip is required. Also the processing to generate clips is performed at the capture device, and not at the server.

The data stored in the FIFO buffer 110 is raw video data received on signal line 109. Because of the need to store this raw video data there is a slight increase in the amount of volatile memory needed at the capture device, but this is offset by the minimal processing overhead at the capture device and the server. The capture logic simply accepts the raw video data from the capture device, queues it and moves on.

When the user wishes to compose the contents of the queue into a shareable clip, it is at this point that this complete sequence of raw video data is processed for streaming.

The software may make an exception to the queue size of the FIFO buffer during the composition process. While the shareable clip is being created, a snapshot of the queue at the moment at which the user taps "share" and generates the clip request signal on line 118 is created, and the cache of raw video data may be allowed to grow beyond its limit until the composition is complete. This ensures that no required raw video data is discarded while the composition is being created.

Preferably the act of creating a clip from the FIFO buffer 110 does not cause the queue to be emptied from the FIFO buffer 110. If, for example, a user taps the "share" icon twice, each tap being one second apart, the second clip is of normal length containing the full contents of the FIFO buffer 110, and not simply one second of content.

In the above example, it is described that the user of the capture device takes action, such as selecting a displayed icon on their display of their user device, in order to generate the clip request signal on line 109 and generate a clip on the data stream from the capture device.

In addition, any user of a capture device streaming data content from their capture device may begin an "action replay" activity to highlight a particular moment in their stream. As the contributing user sees that an interesting moment has just concluded, they may tap the screen of their device and dial backwards in time up to, for example, 30 seconds.

At this point in time, the device will stop streaming content from the camera based on raw video data, and will instead fetch the last seconds of content from its local cache and stream those to the server again. Alternatively it may instruct the server to replay the time period from its own cache.

Where the capture device instructs the server to replay the content from its own cache, then the FIFO buffer 110 may be utilised, and may be suitably sized in order to provide "action replay" content. Thus where an "action replay" will always be of a duration of 30 seconds, the FIFO buffer 110 may be adapted to be able to store 30 seconds of content. The FIFO buffer 110 may then have two modes of operation, and receive two control signals.

One control signal would be the clip control signal received from the clip control block 114 responsive to a clip request.

Figure 5:
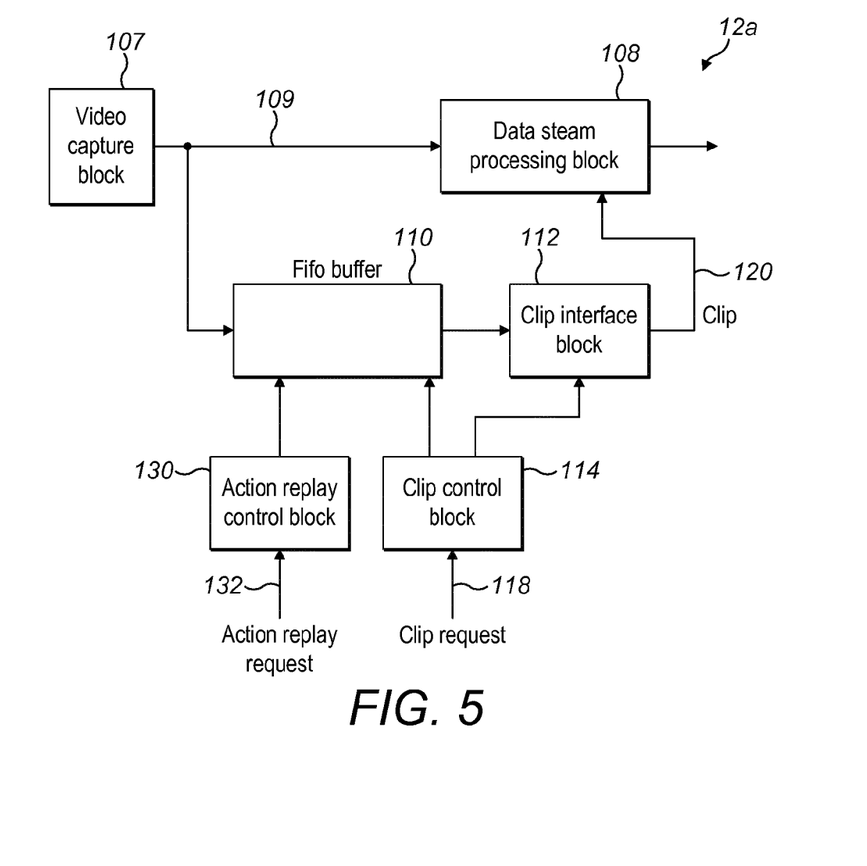
FIG. 5 illustrates an exemplary system for generating a replay.

In addition, and as shown in FIG. 5, there may be provided an action replay control block 130, which receives an action replay request signal on line 132, and generates a control signal on line 134 to the FIFO buffer 110. The action replay signal may be generated, as the clip request signal, by the user of the capture device selecting an 'action replay' icon on the user interface display of the capture device.

In response to a control signal from the action replay control block the FIFO buffer 110 may output its full 30 second contents, and in response to a control signal from the clip control 114 the FIFO buffer 110 may just output its last 10 seconds of content. In both scenarios the output is provided to the clip interface block 112.

Preferably for an 'action replay' option, the user may be able to select the time length of the action replay up to a particular maximum of, e.g., 30 seconds.

When the clip interface block 112 outputs content, the data stream processing block processes its output rather than the data on line 109. Thus live streaming is suspended. This will be the case for transmission of clips or action replays in the stream.

The clip interface block 112 provides the same function in FIG. 5 to generate action replays.

Once the action replay is complete (or the cache is exhausted), the capture device will start transmitting live content based on the raw data from the camera once more. In embodiments the action replay may always be the length of the FIFO buffer, or alternatively the "action replay" may have a size indicated by the user selection. If a 30 second FIFO buffer 110 is provided at the capture device as described above, then this may apply an upper limit to the size of the action replay, and the user may be able to transmit an action replay of any length up to 30 seconds.

As the live content is suspended during the transmission of the action replay, anything happening during the action replay will not be streamed and will not be seen by the viewers.

However in an alternative two output streams from the data stream processing block, one used for a continuous live stream, and one used for clip streams or action replay streams.

In a further alternative, that part of the video stream which the contributor associated with the capture device wishes to replay to their audience may instead be shown as a picture-in-picture presentation. As such, viewers will still see the live stream coming from the camera, but will also see the action replay portion, thereby missing none of the action.

Figure 6:
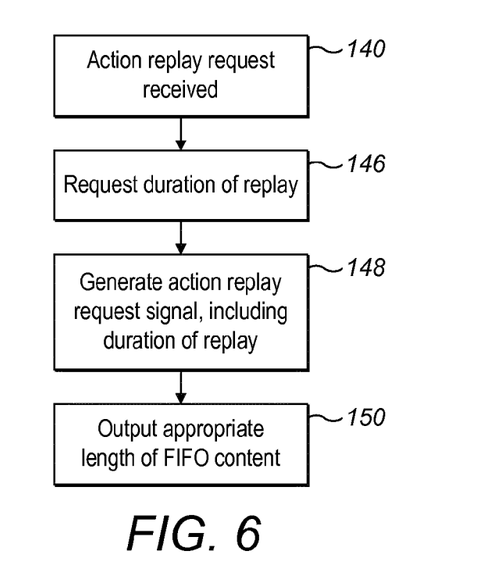
FIG. 6 illustrates an exemplary process for generating a replay.

It will be understood that the process for generating action replays is similar to that of FIG. 4, and an example is illustrated in FIG. 6.

With reference to FIG. 6, in a step 140 an action replay request is received by the capture device, for example responsive to selection of an appropriate icon on the user interface display of the capture device.

In a step 146, a duration of the action replay request is requested. This may involve displaying a question request to the user of the capture device, for example requesting the user to enter a numerical value, or providing some other appropriate display mechanism to seek input as to the duration of the action replay.

Thereafter in step 140 an action replay request is generated on signal line 132, which request includes a duration of the action replay.

In step 150 the appropriate length of content stored in the FIFO buffer 110 is output.

In examples the user may not be able to select the length of the action replay, and the action replay may be of a default length.

Any video processing to deliver this option is performed by the capture device and not the server.

Action replay segments may be used as the basis for sharing clips to social media, and may be triggered and/or suggested by viewer responses.

The duration of the live stream that the contributor may rewind in this way is limited only by the resources available on the capture device and its capacity to cache sufficient content.

This generation of "action replay" content allows contributors to perform an action that improves the quality of their streamed output or which engages viewers more closely. Any content that the platform determines may belong to a rights holder is therefore likely to be of higher value.

The flexibility that live replay offers a contributor allows them to feel more in control of the storytelling and, as such, provide one more important tool to help content creators craft exactly the right experience for their audience. This, in turn, will keep those contributors more engaged with the platform as a creative tool and a means of accessing their viewers.

Often with live streams, particularly when a viewer joins part way in, it can be difficult for them to key into exactly what is going on. Any feature that allows the video stream to be more dynamic, to allow the narrative to be inferred through more than words and actions alone, will make it easy for viewers to feel involved.

In the above examples it is described that the FIFO buffer, and the technique for generating clips or action replays, is associated with the capture device. In alternatives this technique may also be implemented at the server. However this may create processing/storage overheads and may not be as responsive. For example if the capture device user presses a button on their user interface display to clip what just happened, then that request needs to be transmitted to the server before it can be processed. In an implementation on the server rather than a capture device, then the FIFO buffer at the server would need to store streamed data.

Another possibility is that a viewing device may utilise the technique described above, and therefore the user device may implement the process and architecture for generating a clip or an action replay. In this case the viewing device still receives a stream, preferably from the server, and uses this stream to present video on a user interface display of the viewing device. In addition a FIFO buffer provided on the viewing device may be "filled" in accordance with the techniques described hereinabove with respect to the capture device. If the viewer of the viewing device sees a moment they wish to share, then they may press an icon on the user interface display of their device and a clip may be created for sharing from their local buffer. This clip is then streamed from the viewing device.

With the technique implemented on the capture device, the source of data is the raw video data from the camera. With the technique implemented on the server or on the viewing device, the source of data is the incoming stream of data. When implemented on the server or on the viewing device, then there is no requirement to provide function to convert raw video data into a data stream, as set out hereinabove with reference to FIGS. 3 and 5. The FIFO buffer 110 in a server or in a viewing device will simply store or buffer a data stream. In the viewing device the incoming data stream is still presented for view on the display of the viewing device, and then in parallel a clip may be generated on a stream from the viewing device itself.

Figure 7:
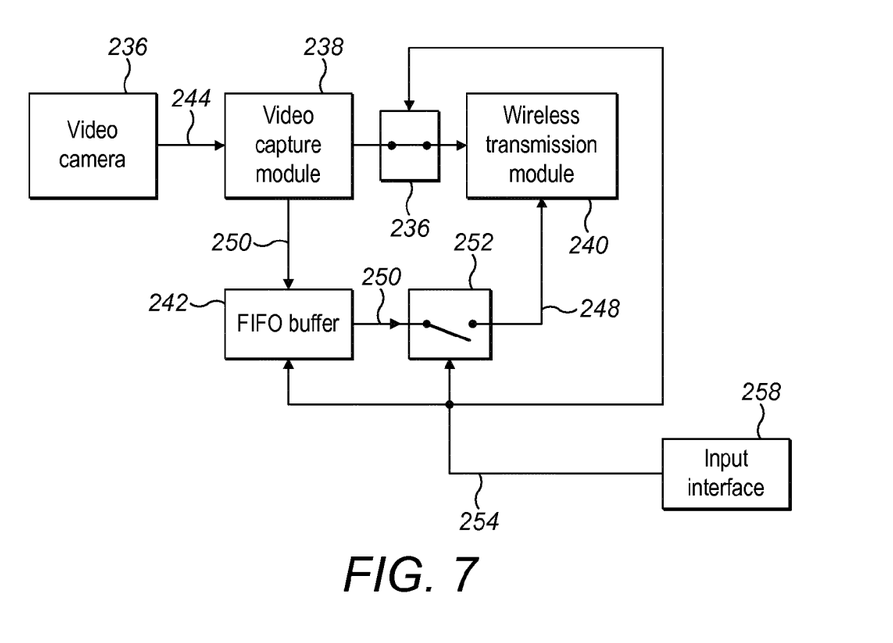
FIG. 7 illustrates an exemplary arrangement for providing clips.

FIG. 7 illustrates an example illustrating how a sample portion of a video stream may be created in a capture device. The sample portion is dynamically modified in accordance with the generation of an ongoing live video stream.

The exemplary capture device includes a video camera 236, a video capture module 238, a FIFO buffer 242, a switch 256, a wireless transmission module 240, a switch 252, and an input interface 258.

The video camera 236 capture video, and provides a captured data stream in line 244 to the video capture module 238. The video capture module 238 provides the captured data stream on line 250 the FIFO buffer 242, and to the switch 236. The output of the switch is connected to the wireless transmission module 240, and the output of the FIFO buffer 242 is connected to the wireless transmission module 240 through the switch 252. The switch 252 receives the output of the FIFO buffer 242 on line 260, and the switch 252 provides a signal to the wireless transmission module on line 240.

The input interface 258 controls the switches 252 and 236, to provide the output from the capture device in accordance with the above description. The input interface 258 may detect the selection of an icon by the user of the capture device.

Figure 8:
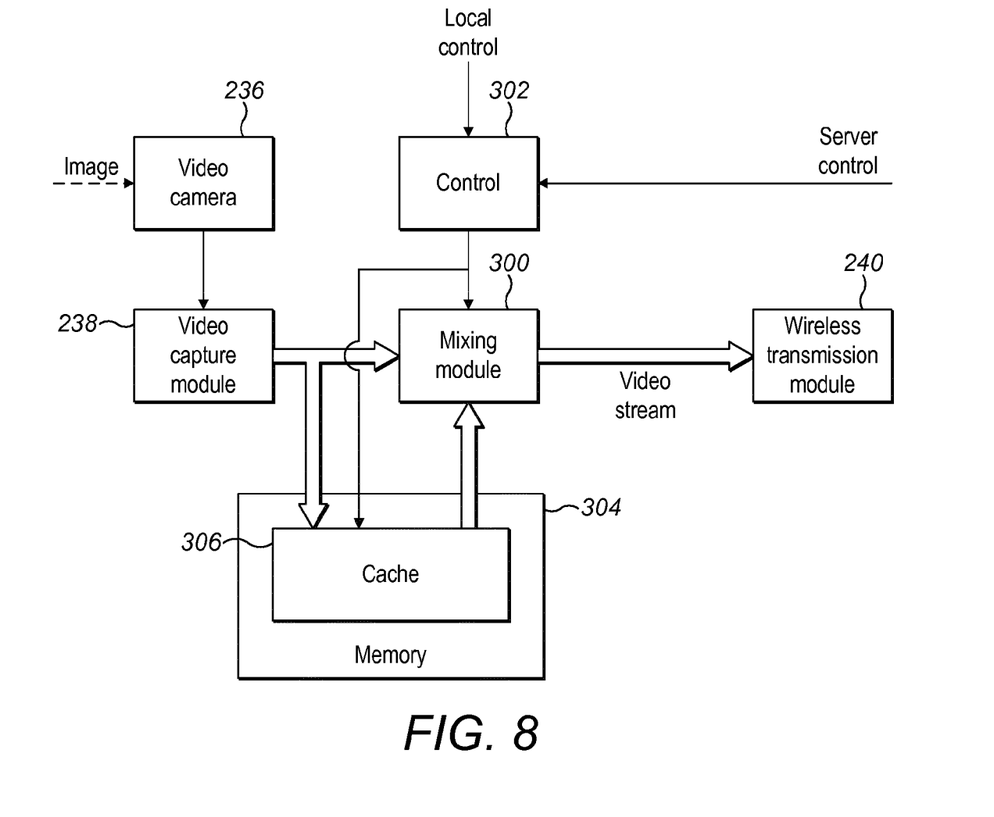
FIG. 8 illustrates an exemplary arrangement for providing clips.

FIG. 8 illustrates the arrangement of the capture device in an alternative arrangement. The capture device has the video camera 236, the video capture module 238, and the wireless transmission module 240. In addition there is provided a control module 302, a mixing module 300, and a memory 304 including a cache 306.

As illustrated in FIG. 8, in this example the cache 306 is a cache of a live video stream and records a certain time portion of the transmitted live video stream. The live video stream may be replayed in dependence upon the captured and stored content. A 10 second store may enable the previous 10 seconds of a live video stream to be cached, such that this 10 second period may be replayed for example.

The mixing module 300 provides the stream to be transmitted to the wireless transmission module 240 in dependence on signals from the control module 302, the mixing module receiving the live streams from the video capture module and the stored streams from the cache 306.

The primary use case is a system in which the capture device manages the clip buffer, ready to create a clip as soon as the capture device user wishes to create it. The secondary use case is a situation where a viewer's device displaying the stream may also cache the content inbound from the server in a similar buffer so that, if the viewer sees a moment of video they wish to share, they can do so by using the clip in their FIFO buffer.

All the examples and embodiments described herein may be implemented as processed in software. When implemented as processes in software, the processes (or methods) may be provided as executable code which, when run on a device having computer capability, implements a process or method as described. The execute code may be stored on a computer device, or may be stored on a memory and may be connected to or downloaded to a computer device.

The invention has been described above with reference to particular examples. The invention is not limited to any particular example set out. In particular the invention may be implemented by using parts of any example described. The invention also may be implemented by combining different parts of any described example. The scope of the invention is set forth in the appended claims.

The invention claimed is:

1. A method of providing a portion of content comprising:
    receiving a data stream including the content;
    processing the received data stream including the content;
    transmitting the processed received data stream;
    storing a portion of the received data stream corresponding to a predetermined time period prior to a time instant;
    responsive to a request at the time instant, capturing the stored portion of the received data stream;
    processing the captured portion of the received data stream;
    suspending the transmission of the processed received data stream while transmitting the processed captured portion; and
    resuming transmission of the processed received data stream on completion of transmission of the processed captured portion,
    wherein a duration of the received data stream corresponding to the duration of the transmitted processed captured portion is not transmitted.

2. The method of claim 1 wherein the request is received at a device processing the data stream.

3. The method of claim 1 wherein the stored portion is a clip of content.

4. The method of claim 1 wherein the stored portion is a replay of data previously transmitted.

5. The method of claim 1 wherein the data stream includes a video data stream, the stored portion includes a portion of the video data stream, and the transmitting includes converting the video data stream into one of a shareable clip of content and an action replay.

6. The method of claim 1 further comprising:
    additionally transmitting the data stream.

7. The method of claim 1 wherein the step of capturing the stored portion comprises capturing a part of the stored portion as indicated by the request.

8. The method of claim 1 wherein the step of storing the portion of the received data stream is limited to storing for the predetermined time period, and the step of capturing the stored portion comprises allowing the stored portion to extend beyond the predetermined time period whilst the stored portion is captured.

9. A computer device for providing a portion of content, configured to:
    receive a data stream including the content;
    process the received data stream including the content;
    transmit the processed received data stream;
    store a portion of the received data stream corresponding to a predetermined time period prior to a time instant;
    responsive to a request at the time instant, capture the stored portion of the received data stream;
    process the captured portion of the data stream;
    suspend the transmission of the processed received data stream and transmit the processed captured portion; and
    resume transmission of the processed received data stream on completion of transmission of the processed captured portion of the received data stream,
    wherein a duration of the received data stream corresponding to the duration of the transmitted processed captured portion is not transmitted.

10. The computer device of claim 9 wherein the stored portion is stored in a first-in, first-out buffer having a predetermined size corresponding to the predetermined time period.

11. The computer device of claim 10 further configured to:
    update the stored portion on receipt of the data stream, such that a most recently received portion of the data stream corresponding to the predetermined time period is stored.

12. The computer device of claim 11 further configured to:
    delete a part of the stored received data stream on storing of a new part of the received data stream.

13. The computer device of claim 9 wherein the stored portion is a clip of content.

14. The computer device of claim 9 wherein the stored portion is a replay of data previously processed for transmission.

15. The computer device of claim 9 wherein the data stream includes a video data stream, the stored portion includes a portion of the video data stream, and the transmitting includes converting the video data stream into one of a shareable clip of content and an action replay.

16. The computer device of claim 9 wherein the computer device is one of a mobile device and a server.

17. A non-transitory computer readable medium storing a program causing a computer to execute provision of content, the provision of content comprising:
    receive a data stream including the content;
    process the received data stream including the content;
    transmit the processed received data stream;
    store a portion of the received data stream corresponding to a predetermined time period prior to a time instant;
    responsive to a request at the time instant, capture the stored portion of the received data stream;
    process the captured portion of the data stream,
    suspend the transmission of the processed received data stream and transmit the processed captured portion; and
    resume transmission of the processed received data stream on completion of transmission of the processed captured portion of the received data stream,
    wherein a duration of the received data stream corresponding to a duration of the transmitted captured portion is not transmitted.

* * * * *